RADAR CLUTTER VIDEO PROCESSING SYSTEM

Filed April 4, 1966 10 Sheets-Sheet 1

INVENTOR.
RICHARD D. WILMOT,
BY J. K. Haskell
ATTORNEY.

| $C_0$ | | $C_1$ | | | | $C_2$ | | | | $C_3$ | | | | $C_4$ | | | | $C_5$ | | | | $C_6$ | | | | $C_7$ | | | |
|---|---|---|---|---|---|---|---|---|---|---|---|---|---|---|---|---|---|---|---|---|---|---|---|---|---|---|---|---|---|
| $R_0$ | | Q88 | - | - | Q85 | Q88 | - | - | Q85 | Q88 | - | - | Q85 | Q88 | - | - | Q85 | Q88 | - | - | Q85 | Q88 | - | - | Q85 | Q88 | - | - | Q85 |
| | | 0 | 0 | 0 | 0 | 0 | 0 | 0 | 1 | 0 | 0 | 1 | 0 | 0 | 0 | 1 | 1 | 0 | 1 | 0 | 0 | 0 | 1 | 0 | 1 | 0 | 1 | 1 | 0 |
| | HIT PATTERN | F44 | - | - | F41 | F44 | - | - | F41 | F44 | - | - | F41 | F44 | - | - | F41 | F44 | - | - | F41 | F44 | - | - | F41 | F44 | - | - | F41 |
| $R_1$ | NO CLUTTER | 0 | 0 | 0 | 0 | 0 | 0 | 0 | 0 | 0 | 0 | 0 | 1 | 0 | 0 | 1 | 0 | 0 | 0 | 1 | 1 | 0 | 1 | 0 | 0 | 0 | 1 | 0 | 1 |
| $R_2$ | 3 CONSECUTIVE HITS | 0 | 0 | 0 | 1 | 0 | 0 | 1 | 0 | 0 | 0 | 1 | 1 | 0 | 1 | 0 | 0 | 0 | 1 | 0 | 1 | 0 | 1 | 1 | 0 | 1 | 0 | 0 | 0 |
| $R_3$ | 4 \| \| | 0 | 0 | 1 | 0 | 0 | 0 | 1 | 1 | 0 | 1 | 0 | 0 | 0 | 1 | 0 | 1 | 0 | 1 | 1 | 0 | 1 | 0 | 0 | 0 | 1 | 0 | 0 | 0 |
| $R_4$ | 5 \| \| | 0 | 0 | 1 | 1 | 0 | 1 | 0 | 0 | 0 | 1 | 0 | 1 | 0 | 1 | 1 | 0 | 1 | 0 | 0 | 0 | 1 | 0 | 0 | 0 | 1 | 0 | 0 | 0 |
| $R_5$ | 6 \| \| | 0 | 1 | 0 | 0 | 0 | 1 | 0 | 1 | 0 | 1 | 1 | 0 | 1 | 0 | 0 | 0 | 1 | 0 | 0 | 0 | 1 | 0 | 0 | 0 | 1 | 0 | 0 | 0 |
| $R_6$ | 7 \| \| | 0 | 1 | 0 | 1 | 0 | 1 | 1 | 0 | 1 | 0 | 0 | 0 | 1 | 0 | 0 | 0 | 1 | 0 | 0 | 0 | 1 | 0 | 0 | 0 | 1 | 0 | 0 | 0 |

FIG. 4.

| $C_0$ | | $C_1$ | | | | $C_2$ | | | | $C_3$ | | | | $C_4$ | | | | $C_5$ | | | | $C_6$ | | | | $C_7$ | | | | $C_8$ | | | |
|---|---|---|---|---|---|---|---|---|---|---|---|---|---|---|---|---|---|---|---|---|---|---|---|---|---|---|---|---|---|---|---|---|---|
| $R_0$ | | Q88 | - | - | Q85 | Q88 | - | - | Q85 | Q88 | - | - | Q85 | Q88 | - | - | Q85 | Q88 | - | - | Q85 | Q88 | - | - | Q85 | Q88 | - | - | Q85 | Q88 | - | - | Q85 |
| | | 1 | 0 | 0 | 0 | 1 | 0 | 0 | 1 | 1 | 0 | 1 | 0 | 1 | 0 | 1 | 1 | 1 | 1 | 0 | 0 | 1 | 1 | 0 | 1 | 1 | 1 | 1 | 0 | 1 | 1 | 1 | 1 |
| | HIT PATTERN | F44 | - | - | F41 | F44 | - | - | F41 | F44 | - | - | F41 | F44 | - | - | F41 | F44 | - | - | F41 | F44 | - | - | F41 | F44 | - | - | F41 | F44 | - | - | F41 |
| $R_1$ | NO CLUTTER | 1 | 0 | 0 | 1 | 1 | 0 | 1 | 0 | 1 | 0 | 1 | 1 | 1 | 1 | 0 | 0 | 1 | 1 | 0 | 1 | 1 | 1 | 1 | 0 | 1 | 1 | 1 | 1 | 0 | 0 | 0 | 0 |
| $R_2$ | CLUTTER | 1 | 0 | 0 | 0 | 1 | 0 | 0 | 0 | 1 | 0 | 0 | 1 | 1 | 0 | 1 | 0 | 1 | 0 | 1 | 1 | 1 | 1 | 1 | 0 | 1 | 1 | 0 | 1 | 1 | 1 | 1 | 0 |

FIG. 5.

| | HIGH SKIM LEVEL | | LOW SKIM LEVEL | |
|---|---|---|---|---|
| | COUNT IN MEMORY COUNTER | CLUTTER IND. THRESH. LEVEL | COUNTER IN MEMORY COUNTER | CLUTTER IND. THRESH. LEVEL |
| 3 CONSEC. HITS | 5 | 6 | 6 | 7 |
| 4 CONSEC. HITS | 4 | 6 | 5 | 7 |
| 5 CONSEC. HITS | 2 | 5 | 4 | 7 |
| 6 CONSEC. HITS | 1 | 5 | 2 | 6 |
| 7 CONSEC. HITS | 0 | 5 | 1 | 6 |

Nov. 14, 1967 R. D. WILMOT 3,353,177

RADAR CLUTTER VIDEO PROCESSING SYSTEM

Filed April 4, 1966 10 Sheets-Sheet 7

United States Patent Office 3,353,177

Patented Nov. 14, 1967

3,353,177

RADAR CLUTTER VIDEO PROCESSING SYSTEM

Richard D. Wilmot, Fullerton, Calif., assignor to Hughes Aircraft Company, Culver City, Calif., a corporation of California Filed Apr. 4, 1966, Ser. No. 540,800
15 Claims. (Cl. 343—5)

ABSTRACT OF THE DISCLOSURE

A clutter detection system that responds to series of successive binary signals provided by a digitized radar receiver. A shift register, in association with a hit pattern decoding logic network, responds to the binary signals each transmission period to analyze the received clutter pattern encompassing each of a plurality of range intervals. A digital counter network and memory circuit analyzes the received clutter pattern for each range interval over successive transmission periods to provide signals that are indicative of the presence or absence of clutter in each range interval according to a preselected clutter present criteria.

This invention relates to radar processing systems and, more particularly, to a system for processing radar video to automatically detect the presence of clutter.

A major problem in automatic detection, acquisition and digital track-while-scan systems is the automatic processing of all the video returns from the surveillance radar. Generally, to detect targets, the radar video from each range interval is quantized or digitized and recorded as a hit when exceeding a selected threshold level, also known as a skim level. When the number of hits from a given number of sweeps exceeds a selected value, a target is assumed to be present in the particular range interval. Unfortunately, such signals are produced not only by valid targets, and therefore a need exists to distinguish between valid and invalid targets. For example, ground clutter, sea clutter, weather returns, radar interference and radar jamming can produce sufficient hits in a particular range interval to be mistaken for valid targets.

In some systems, all hit reports are stored in a computer memory and processed in accordance with a computer program so as to attempt to distinguish between valid and invalid targets. In other systems, a running count of the hit from a given area in space is made and when the count becomes too high, automatic track acquisition is inhibited from such an area. Both of these methods of automatic target tracking require expensive and complex equipment. The first system requires a very large memory in order to store the large number of hits from valid as well as invalid targets and a complex computer program to distinguish between the targets. The other system requires a large memory to store all the hits in both range and azimuth in order to determine the hit density of any given area. In addition, it requires most complex count-up and count-down logic circuitry. Also, detection of clutter in such systems is a function of the presence of clutter over a large area so the detection of small isolated clutter patterns is impossible.

To reduce the complexity of distinguishing between valid and invalid targets, i.e. detect the presence of invalid targets, hereafter generally referred to as clutter, a system has been developed which is capable of automatically recognizing clutter on the basis of certain predetermined digitized video hit return patterns. Typically, hits produced by a valid target are limited to one or two range intervals and to one antenna beam width in azimuth. The prior art clutter recognizing system detects when this pattern assumed to be characteristic of a valid target does not exist and therefore causes the rejection of the hits as being from a meaningful or valid target.

Briefly, the prior art clutter-recognizing system detects hits patterns from successive range intervals per radar sweep, as well as from successive sweeps in azimuth. On the basis of preselected criteria the system automatically indicates the presence of clutter when hits are received from a given number of successive range intervals and in successive sweeps. For example, when hits are present in three successive range intervals in each of three successive sweeps in azimuth, a hit pattern of three by three is produced which in the prior art system indicates the presence of clutter. Similarly, hits in four successive range intervals in two successive sweeps producing a hit pattern of four by two is indicative of clutter. Other clutter indicative patterns are hits in five successive range intervals preceded or followed by hits in three or more successive range intervals or hits in six or more successive range intervals in a single sweep.

Such a clutter recognizing system has been found to be quite useful in detecting clutter which covers a solid or contiguous area, since the hit patterns use the criteria for the detection of clutter which are based on solid areas, such as three by three, four by two, etc. The system has been found to be effective in detecting evenly diffused clutter in solid areas. However, it has been found to be ineffective in detecting broken up clutter. For example, hits in five or fewer consecutive range intervals which were not followed by hits in consecutive range intervals in adjacent sweeps were disregarded as being hits from a clutter pattern, even though such hits may have been received from a broken up rather than a solid area clutter pattern. Since broken up clutter patterns are quite typical, a need exists for a system which is capable of automatically detecting the presence of broken up clutter, using such information to inhibit the radar system from regarding hits received from such an area as indicative of the presence of a valid target in the area.

It is therefore an object of the present invention to provide an improved system for automatically distinguishing between video returns from valid and invalid targets by video hit pattern analysis.

Another object of the present invention is to provide an improved system for automatically detecting the presence of invalid targets such as clutter.

Still another object of the invention is the provision of a system capable of the automatic detection of comparatively small clutter return patterns in a manner superior to that of presently known clutter detection systems.

A further object of the present invention is to provide an automatic clutter detection system, capable of recognizing clutter patterns which were not detectable by prior art systems.

Still a further object of the present invention is to provide an improved clutter recognizing system capable of automatically detecting clutter patterns including broken up patterns of clutter.

These and other objects of the present invention are accomplished by providing a system in which, for each range interval the history of previous hit patterns in the particular range interval, as well as, in adjacent range intervals is available. This information is used to determine whether or not the present hit in the particular range is due to clutter or a valid target. In general, it is necessary to detect several clutter patterns before it is certain that clutter is present in any particular range interval. This is true because noise is present in any radar system and there is always a finite probability that the noise produces the hits which may be distributed in such a manner as to generate hit patterns mistaken for clutter. In order to minimize the probability that the hit patterns assumed to be that produced by clutter are actually produced by noise, the novel system of the present invention utilizes the history of previous radar sweeps to recognize the existence of clutter even in the presence of noise. Also, the system uses range clutter information to obtain the best estimate of the presence of clutter.

Briefly, in accordance with the teachings of the present invention, a multibit counter is associated with each of the range intervals. In each radar sweep, the hit pattern in the particular range interval as well as in adjacent range intervals is analyzed and the counter associated with the particular interval is augmented as a function of the particular hit pattern. When the count in the counter reaches a predetermined threshold level, it indicates the presence of clutter in the particular range interval. The presence of clutter is used to inhibit the rest of the radar system from providing valid target indication signals for the particular range interval. Once clutter is detected in a particular range, by the count in its respective counter reaching the predetermined threshold level, the hit pattern for the particular range interval is monitored.

The novel features that are considered characteristic of this invention are set forth with particularity in the appended claims. This invention itself both as to its organization and method of operation, as well as additional objects and advantages thereof, will best be understood from the following description when read in connection with the accompanying drawings, in which:

FIGURES 4 and 5 are charts useful in explaining the operation of the system for searching for the presence and end of clutter respectively;

Figure 1:
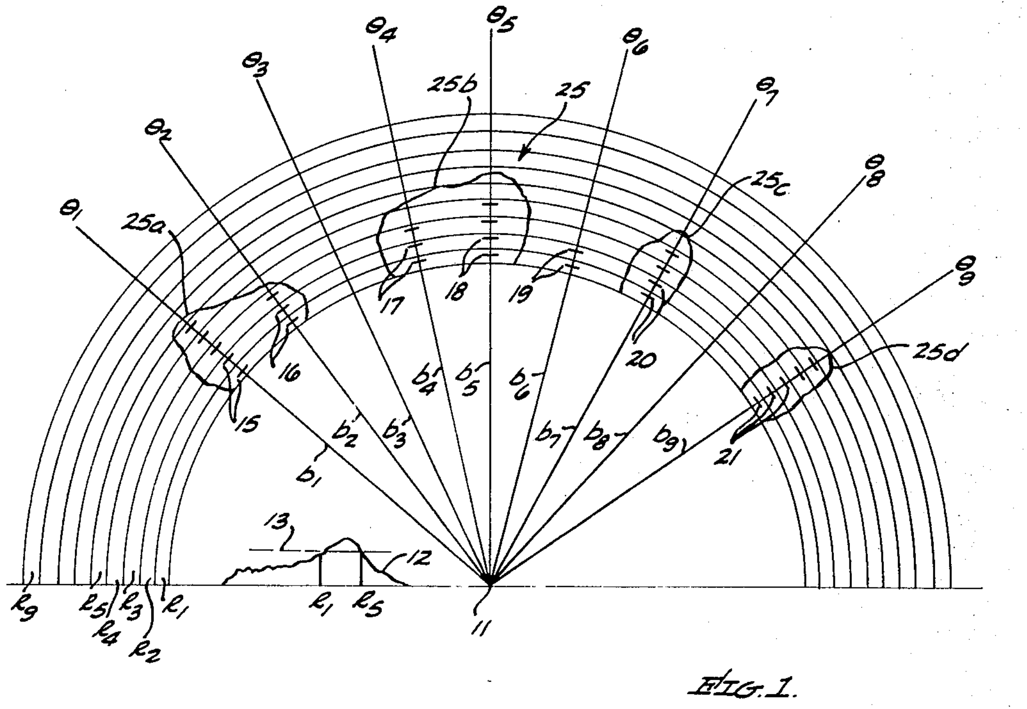
FIGURE 1 is an azimuth range-diagram useful in explaining the teachings of the invention.

For a complete understanding of the novel system of the invention, reference is first made to FIGURE 1 in conjunction with which the mode of operation of the prior art clutter recognizing system herebefore referred to, will first be described. For explanatory purposes, it is assumed that a radar transmitter (not shown) located at point 11 transmits successive beams or radar pulses $b_1$ through $b_9$ when the radar antenna (not shown) is at azimuths designated by $\theta_1$ through $\theta_9$ respectively. In practice the azimuth difference between adjacent beams is only a fraction of a degree such as for example 0.1°. However, in FIGURE 1 the azimuth difference has been exaggerated for explanatory purposes.

It is appreciated by those familiar with the art, that in response to each transmitted radar pulse or sweep, radar video is reflected back to the radar receiver. The radar video, also referred to as video sweeps, comprises the energy reflected back to the receiver from different objects or matter in different range intervals from the transmitter. In FIGURE 1, line 12 is assumed to represent radar video or a video sweep received in response to a transmitted pulse $b_1$. The video sweep may be quantized to provide digital signals each representing the amplitude of the video received from another range interval such as intervals $R_1$ through $R_9$. The digitized video of each range interval may then be compared with a threshold level also referred to as a skim level, designated in FIGURE 1 by line 13. Only when the digitized video from any range interval exceeds the threshold level is a hit recorded, indicating the possibility that a target is located at the particular range interval. For explanatory purposes, let it be assumed that the digitized video of sweep 12 from ranges $R_1$ through $R_5$ exceeds the threshold level 13. Thus hits will be recorded for each one of the range intervals. These are designated in FIGURE 1 by short lines 15 perpendicular to pulse $b_1$, each line being located in another of the range intervals. As is appreciated by those familiar with the art, a series of successive sweeps at each azimuth may be analyzed to determine the presence of a target when a predetermined number of hits are detected in a selected number of sweeps, such as for example 7 hits in 11 sweeps. However, for explanatory purposes it is assumed that hits are determined on the basis of the number in a single video sweep.

In FIGURE 1 it is similarly assumed that hits are recorded for range intervals $R_1$, $R_2$ and $R_3$ in response to pulse $b_2$. These three hits are designated by numerals 16. Hits are also recorded in response to pulses $b_4$, $b_5$, $b_6$, $b_7$ and $b_9$, with the hits being designated by numerals 17, 18, 19, 20 and 21 respectively. No hits are recorded in response to pulses $b_3$ and $b_8$.

In other clutter-recognizing systems, before a hit was assumed to be received from a valid target the hit pattern in the particular sweep, as well as the hit pattern in adjacent sweeps was analyzed to determine the presence of clutter. Thus for example hit 15 from range interval $R_1$ was not immediately assumed to be from a valid target until the clutter condition in range interval $R_1$ at azimuth $\theta_1$ was determined. As herebefore summarized, in other known clutter-recognizing systems clutter was assumed to be present if hits were received from three successive range intervals in three successive sweeps, thereby creating a hit pattern of three by three or when hits were received from four successive range intervals in two successive sweeps, as well as hits in five successive range intervals preceded or followed by a sweep with hits in three successive range intervals. Also hits in six or more successive range intervals in a single sweep was assumed to indicate clutter. However, any other hit patterns were assumed to indicate the absence of clutter so that a recorded hit could be assumed to be from a valid target.

For example, the hit pattern of five successive hits followed by three successive hits was interpreted as the presence of a clutter pattern 25_a_. Thus hits 15 and 16 were inhibited from being processed as hits from valid targets. On the other hand since the hit pattern produced by hits 17 and 18 did not conform to any of the hit pattern criteria used in the prior art systems, as it did not fall within one of the hit patterns assumed to indicate clutter, hits 17 and 18 were used in the processing of valid targets, even though such hits may have been received from a broken-up clutter pattern 25_b_ which together with clutter pattern 25_a_ were parts of an overall large clutter pattern 25.

Figure 2:
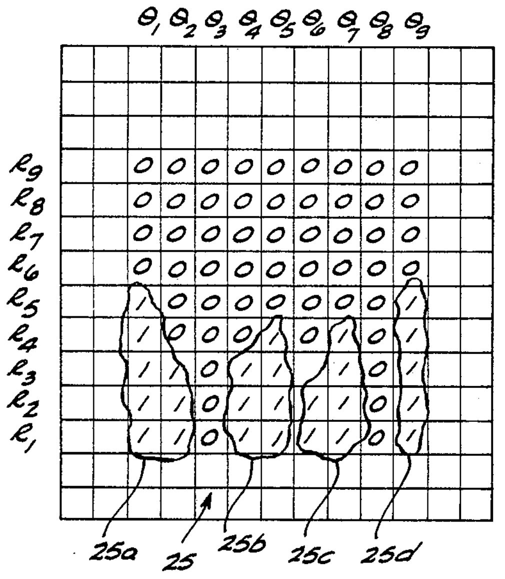
FIGURE 2 is a chart for exemplifying the presence of broken-up clutter in range intervals in successive sweeps.

Similarly, in other known systems, hits 20 in response to pulse $b_7$, forming a hit pattern of hits in only four consecutive range intervals $R_1$ through $R_4$ were not deemed to be hits from a clutter pattern even though in actuality they may have been generated by a broken-up clutter pattern 25_c_. Similarly hits 21, forming a hit pattern of hits in five successive range intervals, without associated hit patterns in adjacent sweeps were disregarded in the prior art clutter-recognizing system, even though such hits (21) may have been created by a clutter pattern 25_d_, which together with clutter patterns 25_a_ and 25_b_ and 25_c_ may be part of an overall clutter pattern 25. The clutter pattern 25 is more clearly indicated in the chart-like diagram of FIGURE 2 wherein the "1"s and "0"s represent hits and misses respectively in successive sweeps from different range intervals.

The inability to detect broken-up clutter patterns is overcome by the novel clutter-recognizing system of the present invention in which the history of the hit patterns in successive sweeps for each range interval is utilized to generate a signal indicating the presence or absence of clutter. For example, for range interval $R_1$, hit patterns 15 through 21, as well as the absence of hit patterns in response to pulses $b_3$ and $b_8$ are utilized to provide a signal to indicate whether clutter is present or absent in range interval $R_1$.

Briefly, this is accomplished by providing an up-down counter for range interval $R_1$. The counter is incremented or decremented as a function of the presence or absence of hit patterns. When the count in the counter reaches a selected count-threshold level, it indicates the presence of clutter in range $R_1$ and inhibits the radar system from utilizing any hits in range interval $R_1$ in the interpretation of a valid target. Once a clutter-presence signal for range $R_1$ is produced, the absence of clutter indicating hit patterns must be present in a sufficient number of sweeps to indicate the end of clutter in range interval $R_1$, at which time the absence of clutter signal is generated to again enable the radar system to respond to hits from range interval $R_1$ and interpret them as being from valid targets.

In one embodiment of the invention the counter associated with each range interval was a four bit counter. The most significant bit when true indicated the presence of clutter while when being false indicated the absence of clutter. The other three bits were used as an up-down counter, which was incremented or decremented in accordance with the following table:

| Hit Pattern | Increment | Decrement |
|---|---|---|
| 2 or fewer consecutive range hits | | 1 |
| 3 consecutive range hits | 1 | |
| 4 consecutive range hits | 2 | |
| 5 or more hits in 10 adjacent range hits | 2 | |
| 5 consecutive range hits | 3 | |
| 6 consecutive range hits | 4 | |
| 7 consecutive range hits | 5 | |

Hereafter when referring to the count in the counter it is assumed to mean the count in the three less significant bits. However, when reference is made to the counter it is assumed to include the most significant bit, even though that bit is not used for counting purposes.

When the count in the counter of a particular range interval reaches a certain count-threshold value or level, the counter provides a clutter-indication signal for that range interval. For example let us assume that the clutter-indication count threshold value is 7 and that the count in the counter associated with range interval $R_1$ is 1 prior to hit pattern 15. The hit pattern 15 of 5 consecutive hits will increment the counter to 4 (3+1) and hit pattern 16 of 3 consecutive hits will increase the count by 1 to 5. Then, the absence of a hit pattern due to pulse $b_3$ will decrement the count to 4. Then hit patterns 17 and 18 will increment the count to 5 and 7 respectively. Once reaching the count of 7 a clutter-indication signal will be produced, inhibiting the use of hits from range interval $R_1$ in the interpretation of valid targets.

Once the presence of clutter in any range interval is detected, the three counting bits of the counter are reset to zero and the most significant bit set to true or a "one" state. The bit patterns in succeeding sweeps are used to sense the end of clutter. The absence of a hit pattern of 3 or more consecutive hits will cause the counter to increment by one while the presence of a clutter-indicating hit pattern will decrement the counter by one. Only when the count in the counter reaches a full count and the succeeding hit pattern indicates the absence of clutter is an end-of-clutter signal produced, again enabling the use of hits from the particular range interval in the detection of valid targets. The end-of-clutter signal causes the resetting of the most significant bit to zero.

For example, in the foregoing example it is assumed that after $b_5$ the counter of range interval $R_1$ reaches the count-threshold level of 7. As a result it provides a clutter-indication signal setting the most significant bit to one and the other bits to zero. Then when hit pattern 19 is received it increments the count to 1 since hit pattern 19 is less than 3 consecutive hits. Hit pattern 20 of more than 3 consecutive hits decrements the count to zero while the absence of a hit pattern of pulse $b_8$ and the more than 3 consecutive hits of pattern 21 will increase the count to one and then decrement it to zero respectively. Thus after pulse $b_9$ the count will still be zero and the counter of range interval $R_1$ will continue to provide a clutter-indication signal. Only when the count in the counter reaches 7 and the next sweep provides a hit pattern of less than 3 consecutive hits is the counter reset to zero and an end-of-clutter signal provided which enables the radar system to use hits from range $R_1$ for automatically interpreting the presence of a valid target therein.

Figure 3:
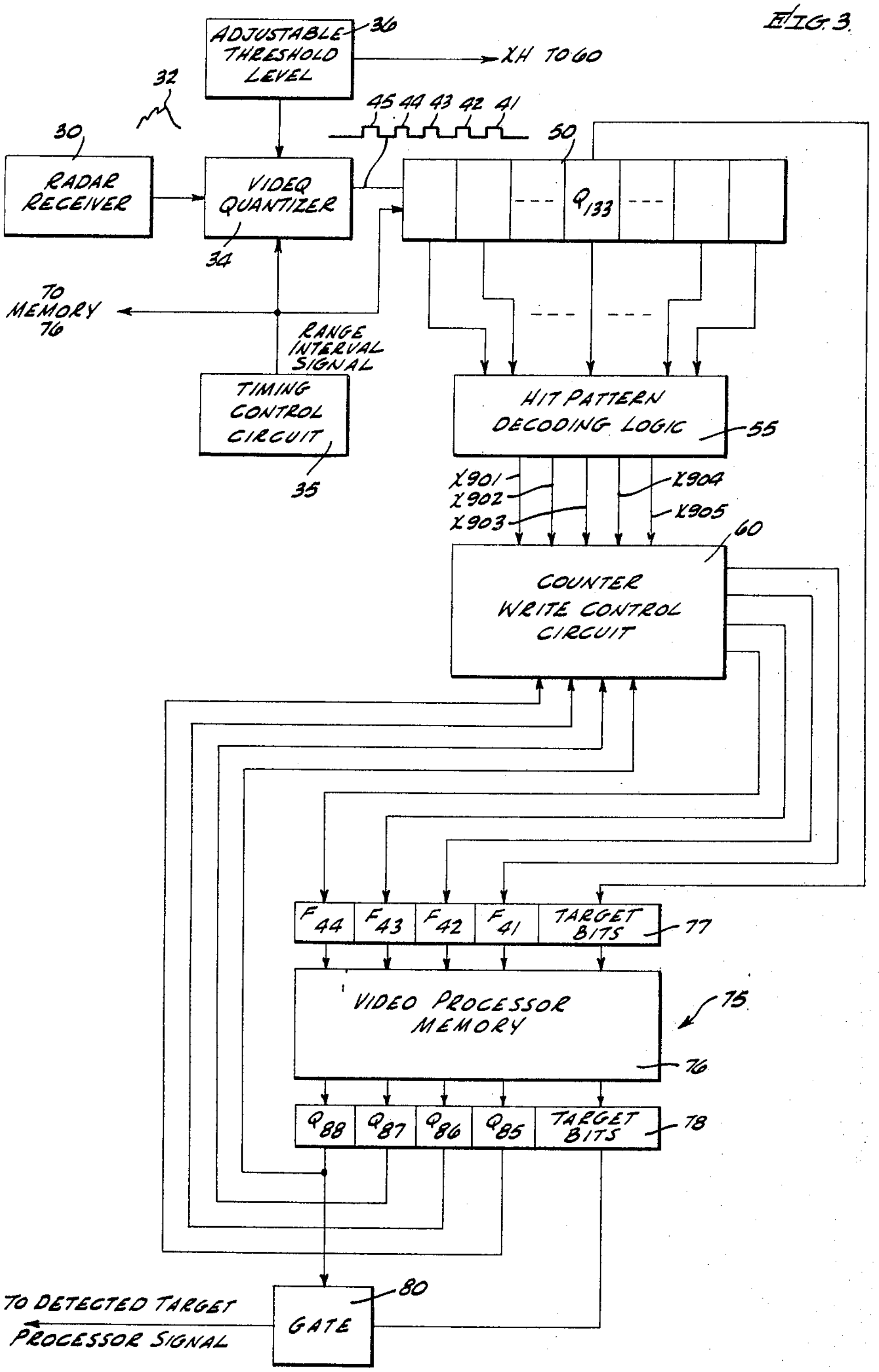
FIGURE 3 is a block diagram of the system of the present invention.

Attention is now directed to FIGURE 3 which is an overall block diagram of the system of the present invention. Therein a radar receiver 30 is assumed to receive radar video in response to each of the transmitted pulses such as $b_1$ (FIGURE 1) and provide an analog video sweep output designated in FIGURE 3 by numeral 32. Each video sweep is supplied to a video quantizer or digitizer 34, the function of which is to convert the analog video sweep into a sequence of digital signals, each representing the video from another range interval. Quantizer 34 is controlled by a timing control circuit 35 which provides the quantizer with range bin or range interval signals, thereby controlling the quantizer's operation to convert the analog video from each range interval into a digital signal. The quantizer is also controlled by an adjustable threshold level 36, the function of which is to provide a threshold or skim level such as that designated in FIGURE 1 by reference numeral 13.

Each of the digital signals produced in the quantizer is compared with this threshold level, with the quantizer producing an output signal of a first binary value such as a "one" when the digital signal from a range interval exceeds the threshold level, while providing a binary signal of second level, such as a "zero" when the digital signal representing video from the range interval is below the threshold level. A binary one output from the quantizer such as pulse 41 in FIGURE 3 represents a hit and a zero output is indicative of a miss. Thus for example in response to pulse $b_1$ (FIGURE 1) when the video sweep 12 is quantized in video quantizer 34 with adjustable threshold level 36 providing the threshold level 13, a series of 5 successive hits such as pulses 41 through 45 will be provided by quantizer 34. Each of the pulses is a binary one representing a hit from another of the range intervals $R_1$ through $R_5$.

The output of quantizer 34, being a series of binary "one"s and "zero"es or hits and misses from the various successive range intervals, is supplied to a multibit shift register 50 which is controlled by the range interval signals from timing control circuit 35 to serially clock the output of quantizer 34 thereinto. Thus each of the "one"s and "zero"es or hits and misses from the quantizer 34 is supplied to the shift register 50 and it advances therein once each period corresponding to a range interval. Briefly, the function of shift register 50 is to store the hit pattern of each video sweep. Each of the bits of shift register 50 is connected to a hit pattern decoding logic 55 the function of which is to detect the presence or absence of any hit pattern such as hits in successive range intervals and provide signals in accordance therewith to a counter write control circuit 60. Thus for example, in response to pulse $b_1$ and the video sweep received therefrom the decoding logic 55 will sense the presence of a hit pattern comprising hits in five successive range intervals and supply a signal to the control circuit 60.

The system of the present invention also includes a video target detector 75 including a video processor memory 76 having a capacity of a plurality of multibit words, the number of words being equal to the number of range intervals to be examined. In one example the computer memory included 1024 multibit words, each word being related to another range interval of interest. The target detector 75 also includes a parallel write register 77 and a parallel read register 78, each register having a number of bits equal to the bits in each one of the words in the memory 76. In FIGURE 3 the portions of registers 77 and 78 designated target bits, represent the bits in the registers into which the presence or absence of hits in any of the range intervals is recorded.

Each of the memory words also includes four bits which are devoted to the detection of presence of clutter in its respective range intervals. The most significant bit of the four bits is used to indicate the presence or absence of clutter, while the other three bits are used as an up-down counter. During each interval period the memory is synchronized to transfer another one of the 1024 words stored therein into the read register 79. In FIGURE 3 bit $Q_{88}$ represents the most significant bit of the four bit counter, used to designate the absence or presence of clutter, while bits $Q_{87}$, $Q_{86}$ and $Q_{85}$ represent the three bit up-down counter in decreasing order. The contents of the four bits is supplied to the counter write control circuit 60 which at the same time is also provided with the hit pattern associated with the particular range interval. On the basis of the previous reading of the counter and the new hit pattern information, control circuit 60 automatically computes the desired setting of the counter and provides such appropriate signals to four bits of write registers 77, which are designated $F_{41}$ through $F_{44}$ respectively in increasing order of significance. Also at the same time the hit information of the particular range interval is supplied from the center bit of shift register 50, designated in FIGURE 3 by $Q_{133}$ to the target bits portion of the write register 77.

For a better understanding of the novel teachings of the present invention, the operation of the system diagrammed in FIGURE 3 will be explained in conjunction with the previous example in which it was assumed that the counter associated with range interval $R_1$ has a count of one (1) prior to hit pattern 15 at azimuth $\theta_1$ (FIGURE 1). The memory 75 is synchronized so that when the word in memory associated with a particular range interval is read into the read register 78 the hit data related to that particular range is in bit $Q_{133}$ of shift register 50. Let us assume that when bit $Q_{133}$ contains the hit 15 of range interval $R_1$, the word associated with range interval $R_1$ is in read register 78. As previously indicated, the counter associated with interval $R_1$ has a count of one, and therefore only bit $Q_{85}$ of register 78 will be true while bits $Q_{86}$ through $Q_{88}$ will be false.

This data is supplied to the counter write control circuit 60. At the same time, the hit data in range intervals $R_1$ through $R_9$ were stored in bits $Q_{133}$ and eight succeeding bits of register 50 will be supplied to hit pattern decoding logic 55. The latter circuits will detect the presence of a hit pattern in five successive range intervals ($R_1$ through $R_5$) and therefore in accordance with the following logic relationship represented in the table hereinbefore referred to, the count of the counter associated with range interval $R_1$ will be incremented by three. This will be expressed by control circuit 60 causing bit $F_{43}$ of write register 77 to be set to true, while the other three bits associated with the counter i.e. $F_{41}$, $F_{42}$ and $F_{44}$ are set false.

At the same time the binary state of bit $Q_{133}$ of register 50 which represents the hit data of range interval $R_1$ is transferred to the target bits portion of register 77. Namely, a hit is stored therein. This data together with the counter state is stored in memory. Then, during a subsequent range interval period, the shift register 50 is advanced by one bit and at the same time the computer memory 76 transfers the word associated with the succeeding range interval i.e. interval $R_2$ into read register 78 so that the content of the counter associated with range interval $R_2$ can be determined in decoding logic 55 to determine whether the counter in the counter therein should be incremented or decremented as a function of the hit pattern associated therewith.

When, in response to transmitter pulse $b_2$, hit 16 associated with range interval $R_1$ is in bit $Q_{133}$ of shift register 50 the memory word associated with range interval $R_1$ is again transferred to the read register 78. Since during the previous sweep the count in the counter associated with $R_1$ was incremented to four, when the word is now read out, bit $Q_{87}$ of read register 78 is true and the other bits remain false. The count of four ($Q_{87}$ being true) is supplied to the control circuit 60. At the same time, the hit pattern 16 is decoded in decoding logic 55. Sensing that the hit pattern comprises hits in three successive range intervals associated with range interval $R_1$, the control circuit 60 is operated to increase the count in the counter associated with range interval $R_1$ by one. This is accomplished by now causing both bits $F_{43}$ and $F_{41}$ of the write register 77 to be set to true. At the same time the fact that a hit 16 was present in range interval $R_1$ is transferred to the target bits portion of register 77 from $Q_{133}$ of register 50.

The logical operation of the novel system of the invention in the searching for the presence of clutter in any range interval may best be summarized in chart form shown in FIGURE 4 to which reference is made herein. In row $R_0$ are diagrammed the various possible combinations of binary states of bits $Q_{85}$ through $Q_{88}$ of read register 78 as counts associated with different range intervals are read thereinto. Since the chart in FIGURE 4 represents the mode of operation of the system in searching for clutter, bit $Q_{88}$ is always false as designated by zero in the chart. Column $C_1$ represents a readout of zero of the counter since all three bits $Q_{85}$, $Q_{86}$ and $Q_{87}$ are zeroes or false, while column $C_2$ indicates a readout of one with bit $Q_{85}$ being true as indicated by a "one." Similarly columns $C_2$ through $C_7$ represent readout of a count of 2 through 6 respectively.

Column $C_1$ indicates the various hit patterns which may be decoded in hit pattern decoding logic 55. Thus for example, when the counter associated with any word is read out and found to be zero such as in column $C_1$ and the decoding logic 55 does not detect any clutter-hit pattern as indicated in row $R_1$ the flip-flops $F_{41}$ through $F_{44}$ are all set to false as indicated by the four zeroes in row $R_1$ column $C_1$. On the other hand, if the count in a counter associated with one of the memory words is one (1) as shown in column $C_2$ and the hit pattern decoded by decoding logic 55 is 7 consecutive hits, such as shown in row $R_6$ the counter write control circuit 60 controls the flip-flops $F_{41}$ through $F_{44}$ setting flip-flops $F_{42}$ and $F_{43}$ to true and flip-flops $F_{41}$ and $F_{44}$ to false as indicated by the 0, 1, 1, 0 combination in column $C_2$, row $R_7$.

If, however, in light of the count read out from the counter associated with the range interval and the decoded hit pattern associated therewith the count in the counter is to be set to 7, which is assumed to be the count-threshold level as hereinbefore defined, then the control circuit 60 resets flip-flops $F_{41}$, $F_{42}$ and $F_{43}$ to zero and sets flip-flops $F_{44}$ to one to indicate the presence of clutter in the particular range interval. For example, in the foregoing example it was assumed that after hit pattern 17 responded to transmitted pulse $b_4$ (FIGURE 1) the counter associated with the range interval $R_1$ was set to five. Thus when the hit pattern in response to successive pulse $b_5$ is analyzed, and the count of 5 in the counter associated with range interval $R_1$ is read out, such as the combination shown in column $C_6$, and the hit pattern 18 of four successive or consecutive hits is detected, the count in the counter should reach seven since when four consecutive hits are detected the counter is incremented by two. However, since a threshold level of seven is assumed to indicate the presence of clutter, when the count in the counter is to be seven or more the counter is reset to zero and the most significant bit is set to one. Namely, control circuit 60 controls flip-flop $F_{44}$ to true as indicated by the 1, 0, 0, 0 combination shown in column $C_6$, row $R_3$.

In the foregoing, the invention has been described in conjunction with detecting the presence of clutter by augmenting or incrementing the counter associated with each range interval as a function of the hit pattern detected in each video sweep. In light of the foregoing examples, the table hereinbefore outlined and the chart in FIGURE 4, it should be appreciated that whereas when a hit pattern of hits in three or more successive range intervals is detected the counter is augmented, when hits are present in two or fewer consecutive range intervals the counter is decremented. Thus as seen from FIGURE 4 whenever no clutter is detected i.e. hits are detected in two or fewer consecutive range intervals as represented by the data in row $R_1$, whatever is read out of the counter represented by the data in row $R_0$ is decremented by one. Thus, for example if a count of two is read out as represented by the data in column $C_3$ row $R_0$, and no clutter is detected as indicated by row $R_1$, the count in the counter is decremented to one as indicated by the setting of flip-flops $F_{44}$ through $F_{41}$ to a 0, 0, 0, 1 setting as indicated in row $R_1$ column $C_3$.

Once clutter is detected in any range interval, i.e. the count in the counter associated therewith reaches the count-threshold level, such as seven hereinbefore assumed, the most significant bit of the counter is set to true and the other three bits are set to false. Thus, when the counter is read out, bit $Q_{88}$ is true while the other three bits $Q_{85}$, $Q_{86}$ and $Q_{87}$ are false, as indicated by the 1, 0, 0, 0 combinations in the chart of FIGURE 4. When bit $Q_{88}$ is true indicating the presence of clutter, any detected target stored in the read register 78 is inhibited from passing to a target processor (not shown) through a gate 80 since the gate is disabled whenever bit $Q_{88}$ is true. Thus as long as bit $Q_{88}$ is true, representing the presence of clutter, the target in the particular range interval is not used in processing or extrapolating the presence of valid targets.

The novel system of the present invention, in addition to detecting the presence of clutter by analyzing the hit patterns produced by each of a series of successive radar sweeps, is also operable to detect the end of clutter, once clutter has been detected. This is accomplished by augmenting the count in the counter whenever the absence of clutter is detected, i.e. namely hits are detected in two or fewer consecutive range intervals, and decrementing the count in the counter whenever any of the expected clutter indicating hit patterns of hits in three or more consecutive range intervals is sensed. When the count in the counter reaches its maximum count and the succeeding radar sweep does not produce one of the clutter indicating hit patterns all the four bits of the counter are reset to zero. Once the most significant bit is reset to zero it indicates the absence of clutter and the previous process of detecting the presence of new clutter is again resumed.

The operation of the system of the present invention in detecting the end of clutter may best be summarized in chart form shown in FIGURE 5 to which reference is made herein. Attention is first directed to column $C_1$ therein. As seen from row $R_0$ of $C_1$ bit $Q_{88}$ is true, indicating that clutter has been detected, while the other three bits, $Q_{85}$, $Q_{86}$ and $Q_{87}$ are false as indicated by the zeroes. If as a result of the succeeding radar sweep no clutter is detected, the couinter is incremented by one as seen by setting flip-flop $F_{41}$ to true. On the other hand, if clutter is detected, i.e. the succeeding radar sweep includes a hit pattern of hits in three or more consecutive range intervals, the counter remains at a zero setting, except for the most significant bit which is true to indicate the presence of clutter. On the other hand, if the counter readout is 1, 0, 0, 1 as seen in column $C_2$, row $R_0$ the absence of clutter will augment the count to 2 to read 1, 0, 1, 0, while the presence of clutter will decrement the count to a setting of 1, 0, 0, 0.

After a sufficient number of successive radar sweeps which do not produce clutter indicating hit patterns the counter may reach a state as indicated in column $C_8$, row $R_0$. Namely, bit $Q_{88}$, being the most significant bit, is still true indicating the presence of clutter and bits $Q_{85}$, $Q_{86}$ and $Q_{87}$ are all true as indicated by the ones. Then if during the next radar sweep no clutter is detected, the four bits of the counter are reset to zero as indicated in row $R_1$ therein. Once the most significant bit is set to false as indicated by the zero therein, it indicates the end of clutter and the system resumes its mode of operation to detect the clutter as herebefore described and outlined in the chart of FIGURE 4.

From the foregoing description, it should now be apparent that in accordance with the teachings of the present invention a counter is included in each memory word associated with another range interval. As each memory word is sequentially read out to store therein the hit or miss data in the particular range interval for each radar sweep, the hit pattern produced by the radar sweeps in relation to the particular range interval is analyzed and the count in the counter of the range interval is either incremented or decremented as a function of the presence or absence of clutter indicating hit patterns. The amount by which the counter is incremented is a function of the particular clutter indicating hit pattern. Thus if the number of consecutive range intervals in which hits are present is greater the magnitude of increment is greater. Once the count in the counter reaches a preselected count-threshould level, such as seven hereinbefore used for explanatory purposes, the counter is reset and its most significant bit is set to true to indicate the presence of clutter. As long as clutter is present, a target from that particular range interval is inhibited from being used by a target processor for the extrapolation of valid targets.

The system of the present invention also is operable to detect the end of clutter by incrementing the counter whenever clutter indicating hit patterns are not present and decrementing the counter whenever valid clutter indicating patterns are present. When the counter reaches its maximum count and the succeeding radar sweep does not produce a clutter indicating hit pattern, all the bits of the counter including the most significant bit are reset to false and the system is again operated to detect the presence of clutter. The most significant bit of the counter may be thought of as the clutter indicating bit which when true indicates the presence of clutter, while when being false indicates the absence thereof.

Herebefore, the count-threshold level, with which the count in the counter is compared to determine the presence of clutter, has been assumed to be fixed at seven. Thus only when the count in the counter reaches seven or more was the presence of clutter assumed. It has been found that the sensitivity of the novel system of the present invention in detecting broken-up clutter may be increased by controlling the count-threshold level to be a variable rather than fixed. In one preferred embodiment of the present invention, the count-threshold level was made a function of the threshold or skim level used in quantizer 34 (FIGURE 3) in indicating the presence of a hit or a miss in any of the range intervals. It is appreciated that when a higher skim level is used, that is a higher threshold level is employed so that only when the quantized video exceeds such higher levels is a hit indicated, the probability that such a hit is from a very valid target is increased. At the same time when a higher skim level is employed and hits are received from a group of consecutive range intervals such a hit pattern is more probably a result of the presence of clutter. In addition to employing the skim level, the count in the counter at any given time as well as the hit pattern detected are used in automatically determining the threshold level used to compare the count in the counter in order to indicate the presence of clutter.

Figure 6:
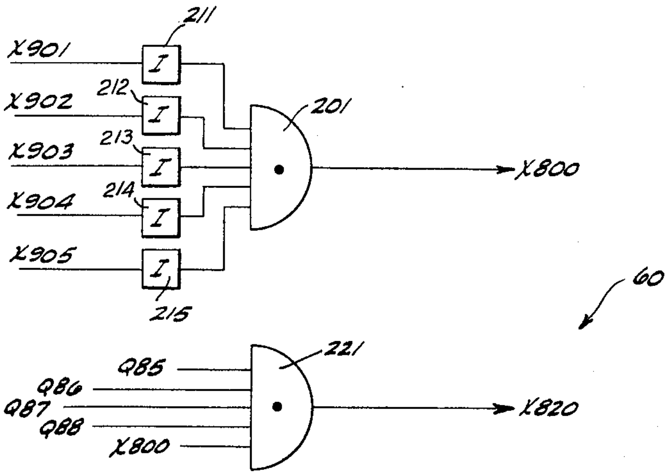
FIGURE 6 is a chart useful in explaining the manner in which a variable count threshold level is generated as a function of various factors.

The manner in which the threshold level is automatically varied as a function of the aforementioned variables may best be summarized in chart form shown in FIGURE 6 to which reference is made herein. As seen from FIGURE 6 when a high skim level is employed and the count in the memory counter is five and the hit pattern detected includes hits in three consecutive range intervals, the threshold level with which the count in the counter is compared is automatically adjusted to be six, while if a lower skim level is employed in quantizer 34 the threshold level necessary to indicate clutter is seven when the count in the memory counter is six and three consecutive hits are detected. It should be apparent from FIGURE 6 that as the detected hit patterns indicate hits in a larger number of successive range intervals, the threshold level necessary to indicate the presence of clutter is reduced.

Figure 7:
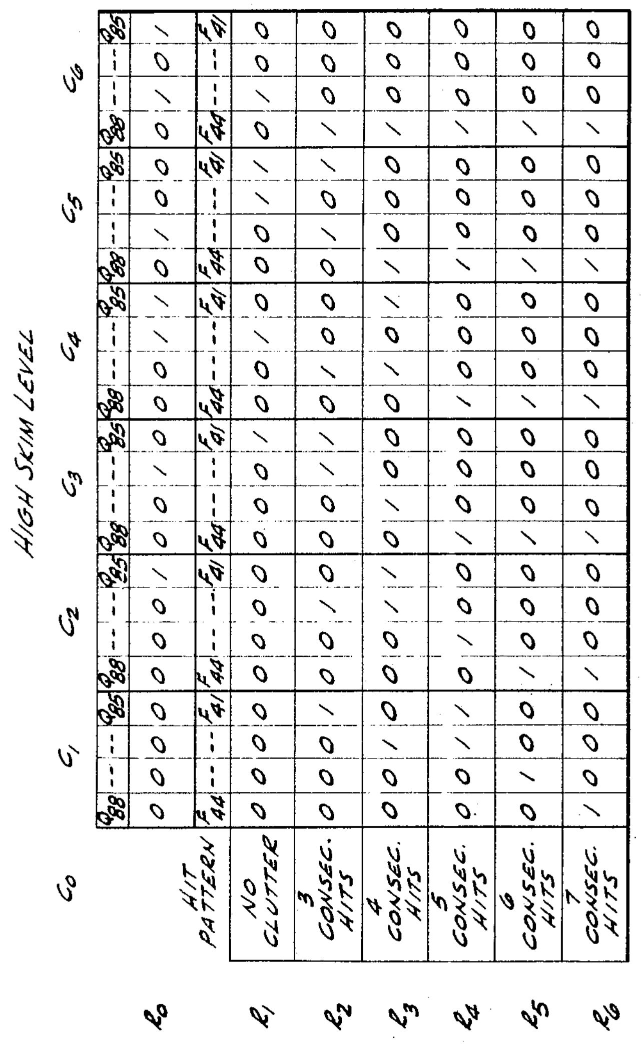
FIGURES 7 and 8 are charts similar to the chart of FIGURE 4.
Figure 8:
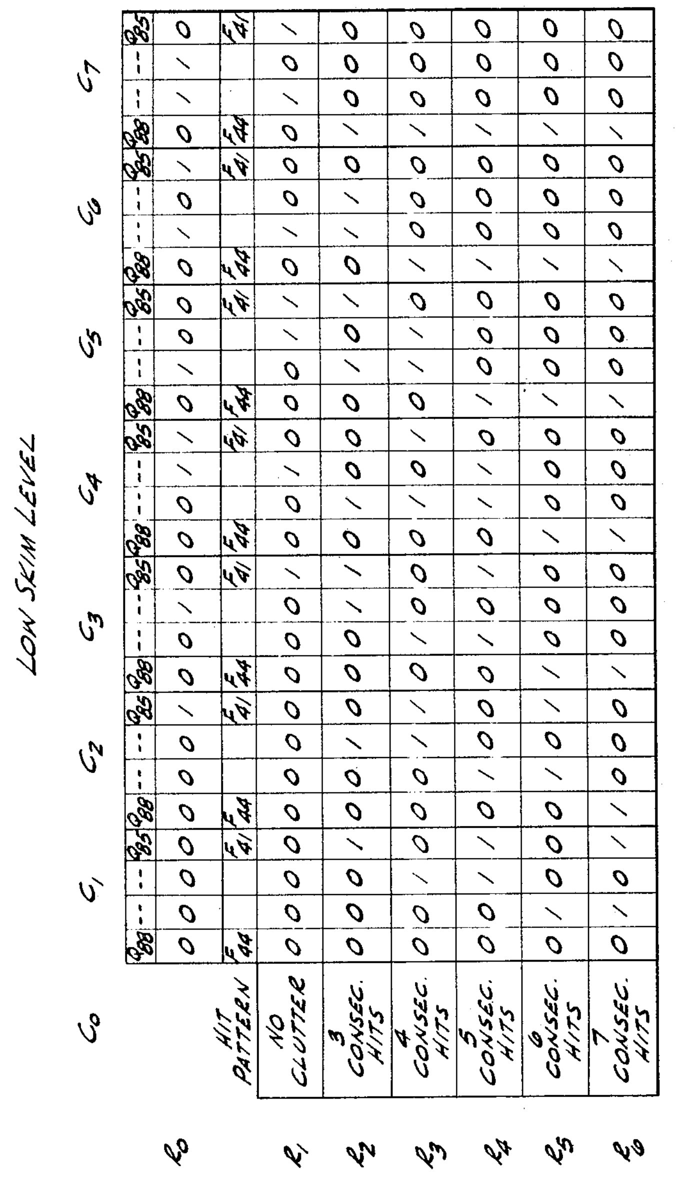

The operation of the system of the present invention when a high skim level is employed is shown in chart form in FIGURE 7, while FIGURE 8 is a chart representing the operation of the system in detecting the presence of clutter when a lower skim level is employed. Thus, whereas the chart in FIGURE 4 represents the operation with a fixed threshold level of seven, the chart in FIGURES 7 and 8 represent the operation of the system with a variable threshold level. The count-threshold level is as herebefore explained a function of the skim level used in quantizer 34 the detected hit pattern, as well as, the count at any particular time in the counter associated with each one of the range intervals. The actual values of the high and low skim levels are functions of the quantizer's operation which is not deemed the subject of the present invention.

Figure 9:
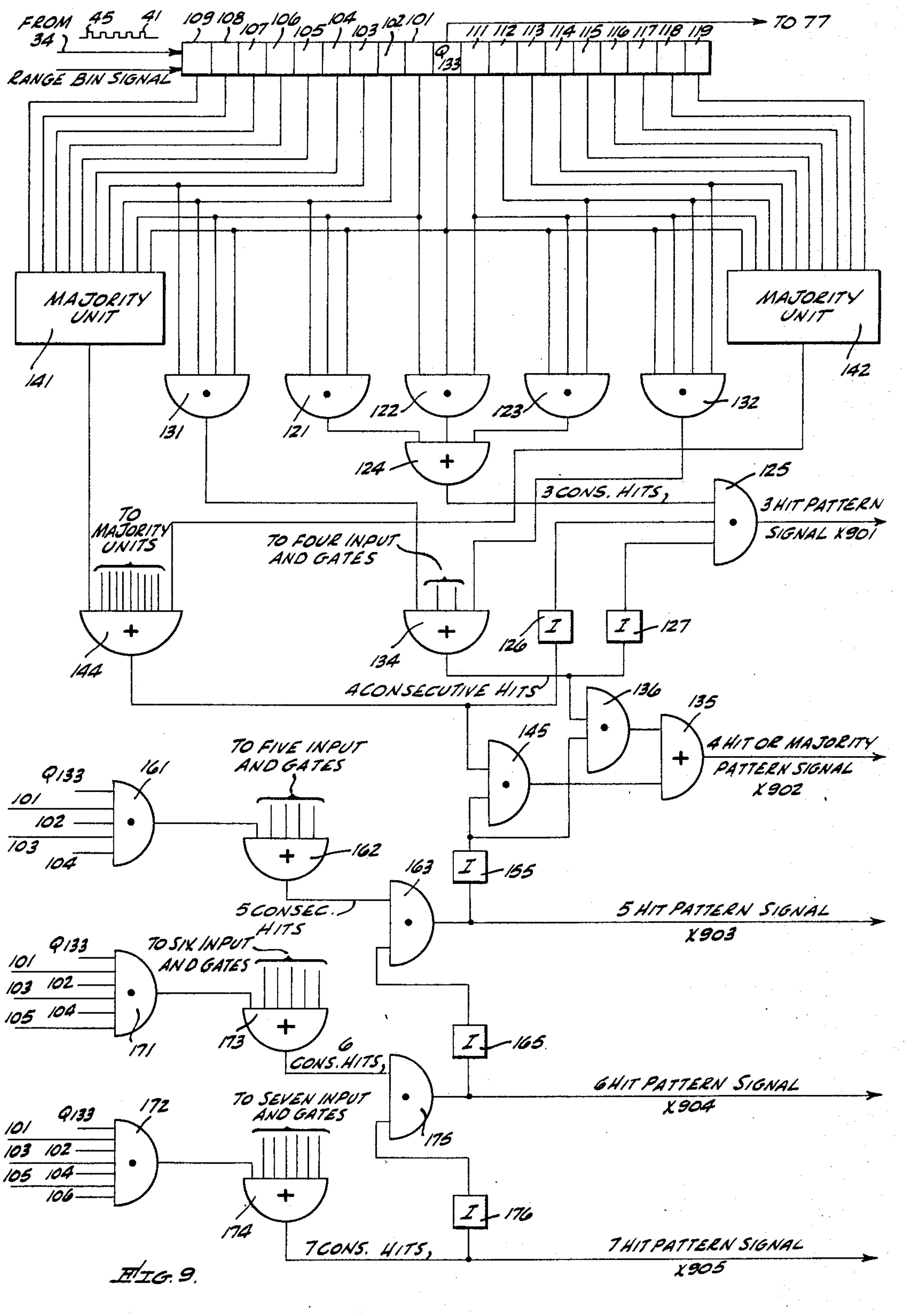
FIGURE 9 is a schematic diagram of the decoding logic shown in FIGURE 3.

Reference is now made to FIGURE 9 which is a schematic block diagram of the shift register 50 and the hit pattern decoding logic 55 shown in FIGURE 3. Hereafter, in describing the system of the present invention, a convention is employed wherein individual "and" and "or" gates are shown as semicircular blocks, with the inputs applied to the straight side and the output appearing on the semicircular side. An "and" gate is indicated by a dot (·) and "or" gate by a plus (+) in the semicircular block. An inverter circuit is shown as a block with the letter I therein. As is generaly known, an "and" gate produces a binary one or true output level only when every input is a binary one or at a true input level, whereas, an "or" gate produces a binary one output whenever any one of the input signals thereto is a binary one or at a true level. On the other hand, an inverter provides a true binary one output only when the input thereto is a zero or at a false input level.

In FIGURE 9, shift register 50 is shown comprising a bit $Q_{133}$ with bits 101 through 109 preceding it in the shift register, while being succeeded by bits 111 through 119. As herebefore explained, the ones and zeroes from video quantizer 34, representing hits or misses at succeeding range intervals are clocked into the shift registers by means of the clocking or control signals from the timing control circuit 35, providing to the shift register one signal per range bin interval. Thus the hits and misses are temporarily stored in the shift registers bits and are clocked to the right once each range bin interval. Thus for example, bits $Q_{133}$, 101 and 111 store at some point in time the hit pattern for range $R_1$ succeeding range $R_2$ and a preceding range thereof. This occurs when the binary signal in $Q_{133}$ represents the hit for range interval $R_1$. A range bin interval period later the binary signal stored in $Q_{133}$ represents the hit for a succeeding range interval, such as $R_2$, etc. Thus each range bin period the binary signal stored in $Q_{133}$ represents the hit or a miss from another range interval.

The hit pattern decoding logic 55 includes a plurality of AND, OR and inverter circuits which are used to generate signals representing three hit patterns, four, five, six, and seven hit patterns with respect to the range interval having the hit or miss thereof stored in the bit $Q_{133}$. Thus for example bits $Q_{133}$, 101 and 102 are connected to an AND gate 121 which provides a true output signal only when bits 102, 101, and $Q_{133}$ store binary ones or hits therein, thereby representing that hits are present in range $R_1$, $R_2$ and $R_3$ such as hit pattern 25*a* (FIGURE 1). Similarly bits 101, $Q_{133}$ and 111 are connected to another AND gate 122 to provide a true output only when hits are present in the range intervals preceding and succeeding range interval $R_1$. Also, bits $Q_{133}$, 111, and 112 are connected to an AND gate 123 providing a true output only when hits are present in range interval $R_1$ and the two preceding range intervals thereof. The outputs of AND gates 121, 122 and 123 are supplied to an OR gate 124 providing a true output when hits are present in three consecutive range intervals associated with range interval $R_1$. The output of OR gate 124 is provided to an AND gate 125 which is also provided with the outputs of inverters 126 and 127. The two inverters provide true output signals only when high order hit patterns are absent. Thus the AND gate 125 provides a three hit pattern signal only when hits are present in three consecutive range intervals, one of them being range interval $R_1$ associated with the hit data in $Q_{133}$, and hits are not present in a larger number of consecutive range intervals.

In a similar manner, signals representing hit patterns in four, five, six and seven consecutive range intervals are generated. For example consider bits 101, 102, and 103 on one side of $Q_{133}$ and bits 111, 112, and 113 on the other side of $Q_{133}$. Bits 101, 102, 103, $Q_{133}$, 111, 112, and 113 may be grouped into four sets with each set comprising four consecutive bits, and the signals representative of the bits of each set may be applied to AND gates (not shown). The output signals of the four AND gates (one AND gate for each set of four bits) are supplied to an OR gate 134, the output of which is true only when a hit pattern is detected in at least one combination of four consecutive range intervals. The output of an OR gate 134 is supplied to an OR gate 135 through an AND gate 136, the function of which is to provide a true output to gate 135 only when higher order hit patterns, i.e., hits in more than four consecutive range intervals, are not detected. In accordance with the teachings of the present invention, the significance in the detection of clutter attached to the presence of hit in four consecutive range intervals is assumed to be the same as if hits were detected in a majority of a given number of range intervals. For example, it has been found that the significance of hits in four consecutive range intervals is equal to that which should be attached to the presence of hits in a majority of range intervals out of ten consecutive range intervals with respect to $R_1$. Thus, in accordance with the teachings of the present invention, ten majority units, two of which are designated by numerals 141 and 142, are employed in the hit pattern decoding logic 55. Each majority unit is connected to another one of ten consecutive bits of shift register 50, one bit being $Q_{133}$. Each majority unit provides a true output signal only when five or more of the inputs thereto are true. The outputs of the various majority units are supplied to an OR gate 144 which provides a true output signal only when a majority of hits is detected in at least one combination of ten consecutive range intervals. The output of OR gate 144 is also supplied to OR gate 135 through an AND gate 145 having the output thereof connected to an inverter 155 which provides a true output signal to gates 145 and 136 only when higher order hit patterns are not presented. Thus it should be appreciated to those familiar with the art that the output of OR gate 135 will be true only when a four hit pattern or a hit pattern in a majority of ten consecutive range intervals is detected, and higher order hit patterns are not present.

In similar manner, signals representing five hit patterns, six hit patterns and seven hit patterns are generated. In FIGURE 9, AND gate 161 represents one AND gate to which five consecutive bits are connected, the output thereof being supplied to an OR gate 162 which provides a true output signal whenever a hit pattern is present in one five consecutive range interval combination. The output of gate 162 is connected to an AND gate 163 having another input connected to an inverter 165 which has a true output only when higher order hit patterns, i.e., six and seven hit patterns, are absent. Thus, AND gate 163 provides a true output when a hit pattern of five consecutive range intervals is present and higher order hit patterns are absent. AND gate 171 is connected to six consecutive hits, while AND gate 172 is connected to seven consecutive bits. The outputs of gates 171 and 172 are connected to OR gates 173 and 174 respectively. OR gate 174 is true only when hits are detected in seven consecutive range intervals. On the other hand, OR gate 173 is true when hits are detected in six consecutive hit patterns. The output of OR gate 173 is connected to an AND gate 175 having another input connected to an inverter 176 which is true when a seven hit pattern is absent. Thus the output of AND gate 175 is true when a pattern in six consecutive range intervals is detected and a pattern in seven consecutive range intervals is absent. For explanatory purposes only, the outputs of gates 125, 135, 163, 175, and 174 will hereafter also be referred to as X901, X902, X903, X904, and X905 respectively. The least significant number in each figure represents the magnitude by which the counter is incremented. Thus for example a three hit pattern signal when detected causes the counter associated with the particular range interval to increment by one while a seven hit pattern X(905) causes the counter to augment or increment by five. From the foregoing description, it should be apparent that only one of the five signals can be true at any given time, with the true signal representing the hits of the largest number of consecutive range intervals. On the other hand, if hits are present in two or fewer number of consecutive range intervals, interpreted in the system of the present invention, as the absence of clutter, all five signals (X901 through X905) will be false.

Signals X901 through X905 are supplied from the hit pattern decoding logic 55 to the counter write control circuit 60 which is also supplied with the binary state of bits $Q_{85}$ through $Q_{88}$ of the read register 78. Thus during each range bin intervals, the state of the counter associated with the range interval having its hit data at that time in bit $Q_{133}$ of register 15 is supplied together with signals X901 through X905 which represent different hit patterns associated with the range interval having its hit data in $Q_{133}$ so that control circuit 60 may generate signals to either augment or decrement the counter by controlling the binary state of flip-flops $F_{41}$ through $F_{44}$ of write register 76. That is, the function of counter write control circuit 60 is to perform the logic necessary to generate the relationships shown in FIGURES 7 and 8 for the detection of the presence of clutter, as well as the relationships diagrammed in the chart of FIGURE 5 to detect the end of clutter once clutter has been detected.

Figure 10:
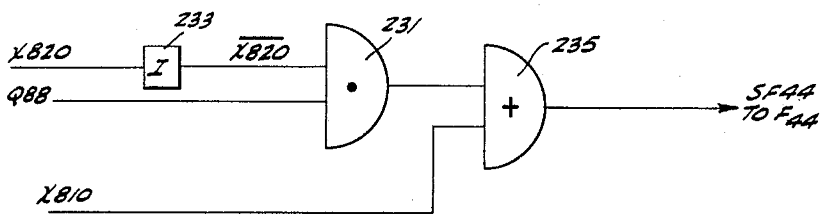
FIGURES 10 through 14 are schematic diagrams of circuits incorporated in the counter write control circuit shown in FIGURE 3.

It should be recalled that during the mode of operation of detecting the presence of clutter, when a no-clutter hit pattern is detected, i.e. hits are detected in two or fewer consecutive ranges, the counter is decremented by one as indicated by rows $R_1$ of charts 7 and 8, while in the mode of searching for the end of clutter when a no-clutter hit pattern is detected, the counter is incremented by one. Providing a signal representing a no-clutter hit pattern may be conveniently generated by an AND gate 201 shown in FIGURE 10 which is a schematic diagram of various logic circuitry of counter write control circuit 60. AND gate 201 is provided with signals X901 through X905 through inverters 211 through 215. Thus, when all the five signals X901 through X905 are false, i.e. a clutter pattern of three or more consecutive range intervals is not present, the five inputs to AND gate 201 are true so that its output designated X800 is true. On the other hand, when the output of gate 201 is false, i.e. a signal designated by $\overline{\mathbf{X800}}$, it indicates that one of the hit patterns representing the presence of clutter is present.

The signal necessary to reset all the four bits $F_{41}$ through $F_{44}$ of write register 77 (FIGURE 2) when the four bits of read register 78, i.e., $Q_{85}$ through $Q_{88}$, are all in a binary one state, is generated in a similar manner. This may be accomplished by an AND gate 221 (FIGURE 10) having its five inputs connected to the four bits $Q_{85}$ through $Q_{88}$ of read register 88 as well as to the output of AND gate 201. Only when the fuor bits are true and the output X800 of And gate 201 is true does AND gate 221 provide an output signal designated X820 which is true. This signal is used in the control circuit 60 to reset the four flip-flops $F_{41}$ through $F_{44}$ of the write register to zero or to a false state as indicated by row $R_1$ column $C_8$ in FIGURE 5.

As previously pointed out, during the search for clutter mode of operation, the most significant bit of the counter is set to a true levle whenever the count in the counter reaches the preselected count-threshold level. As previously indicated in conjunction with the description of the charts in FIGURES 7 and 8, in the preferred embodiment of the invention, the threshold level is a function of the skim level used in video quantizer 34 as well as the count in the counter and the particular hit patterns sensed at any given time. The logic equation necessary to generate the signal X810 indicative that the count in the counter has reached the selected count-threshold level may be expressed as follows:

$$
\begin{aligned}
X810 = [\overbrace{X905 \cdot XH}^{A} &+ \overbrace{(X905 + X904 \cdot XH) \cdot Q85}^{B} \\
&+ \overbrace{(X905 + X904 + X903 \cdot XH) \cdot 86}^{C} \\
&+ \overbrace{(X905 + X904 + X903 + X902 \cdot XH) \cdot Q87}^{D} \\
&+ \overbrace{(X905 + X904 + X903 + X902 + 901 \cdot XH) \cdot Q87 \cdot Q85}^{E} \\
&+ \overbrace{(X905 + X904 + X903 + X902 + X901) \cdot Q87 \cdot Q86}^{F}] \, \overline{Q88}
\end{aligned} \qquad (1)
$$

In Equation 1, XH represents a true signal supplied to the control circuit 60 from the adjustable threshold level 36 when a high skim level is used. On the other hand, XH is false as may be hereafter indicated by $\overline{\mathrm{XH}}$ when a lower threshold level is employed in 36. Also in the following equation, X901 through X905 represent the outputs of the hit pattern decoding logic 55 while $Q_{85}$ through $Q_{88}$ are the outputs of the bits in read register 78. A true output is represented by the bit reference numeral while a bar thereacross represents a false output.

From the charts of FIGURES 5, 7 and 8, it should be appreciated that during the search for clutter mode of operation, the most significant bit such as flip-flop $F_{44}$ is set to true when the count-threshold level is reached, i.e. signal X810 is true. On the other hand, in the search for end of clutter mode of operation, that presented by the chart of FIGURE 5, the most significant bit $F_{44}$ remains true as long as $Q_{88}$ which is read out is true and the end of clutter has not been sensed. That is, signal X820 is false. Thus the logical equation for setting flip-flop 44 may be expressed by the following equation:

$$SF44 = X810 + Q88\cdot\overline{X820} \qquad (2)$$

in which SF44 represents the setting the most significant bit $F_{44}$ and $\overline{X820}$ represents the complement of X820. It is thus seen that the most significant bit $F_{44}$ is set to true when either the count-threshold level is reached as indicated by X810, occurring during the search for clutter mode of operation or during the search for the end of clutter when $Q_{88}$ being the most significant bit of the read register is true and the end of clutter is not detected yet, indicated by the complement of X820. The circuitry necessary to generate SF44 is diagrammed in FIGURE 10 by an AND gate 231 having one input connected to bit $Q_{88}$ of read register 78 and the other input connected to the output of AND gate 221 through an inverter 233. The output of AND gate 231 is supplied to one input of an OR gate 235, the other input of which is connected to the logic circuitry generating signal X810. In light of Equation 2 and the foregoing description, it is apparent that the output of OR gate 235 connected to flip-flop $F_{44}$ of write register 78 is true only when either X810 is true or the output of AND gate 231 is true.

Figure 11:
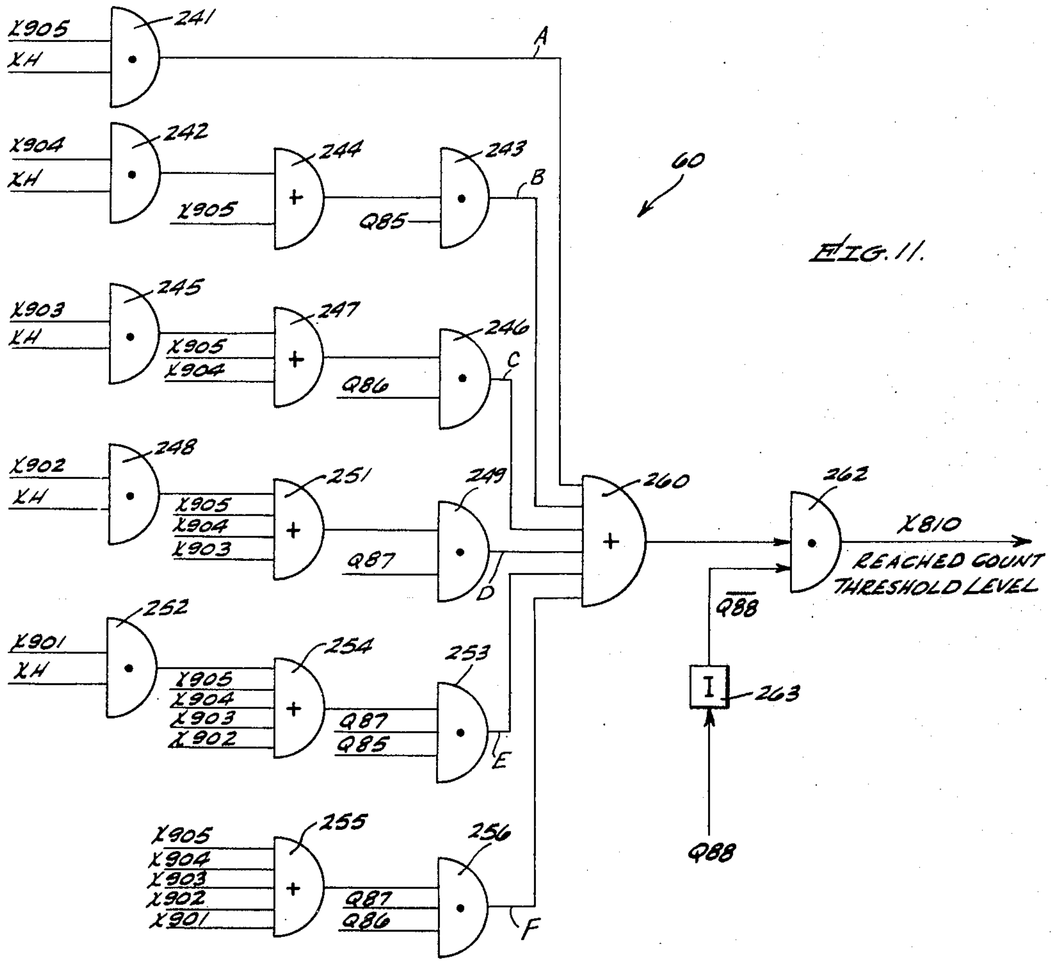

The logic circuitry necessary to generate signal X810 [Equation 1] which represents that the count in the counter has reached the count-threshold level is diagrammed in FIGURE 11 to which reference is made herein. From Equation 1, it is seen that X810 is generated by "or"ing six terms A through F which are ANDed with the term $\overline{Q88}$. In FIGURE 11, AND gate 241 is used to generate term A by ANDing signals X905 and XH which is true when the higher skim level is employed. Similarly, AND gates 242 and 243 and OR gates 244 are used to produce term B. Term C is generated by AND gates 245 and 246 and OR gate 247 while AND gates 248 and 249 and OR gate 251 generate term D. In a similar manner, it can be shown that term E may be generated by AND gates 252 and 253 and OR gate 254 while OR gate 255 and AND gate 256 generate term F. The outputs of gates 241, 243, 246, 249, 253 and 256 are all ORed into an OR gate 260 which has a true output whenever one of the input signals thereto is true. The output of OR gate 266 is supplied to an AND gate 262 which is provided with the output of an inverter 263 provided with an input representing the binary state of bit $Q_{88}$, i.e. the most significant bit of the counter in the read register 78 (FIGURE 3). The output of AND gate 266 is the signal X810 which is true whenever the count in the counter reaches the count-threshold level.

The logic equation expressing the setting of the least significant flip-flop $F_{41}$ in accordance with the relationship expressed in the charts shown in FIGURES 5, 7 and 8 may be expressed as follows:

$$SF41 = [\overbrace{\overline{Q85}\cdot(X901+X903+X905)}^{A_1} + \overbrace{Q85\cdot(X902+X904)}^{B_1} + \overbrace{\overline{Q85}\cdot(Q86+Q87)\cdot X800}^{C_1}]\overline{Q88}\cdot\overline{X810} + \overbrace{\overline{Q85}\cdot[Q86+Q87+X800]\cdot Q88\cdot\overline{X820}}^{D_1} \qquad (3)$$

Figure 12:
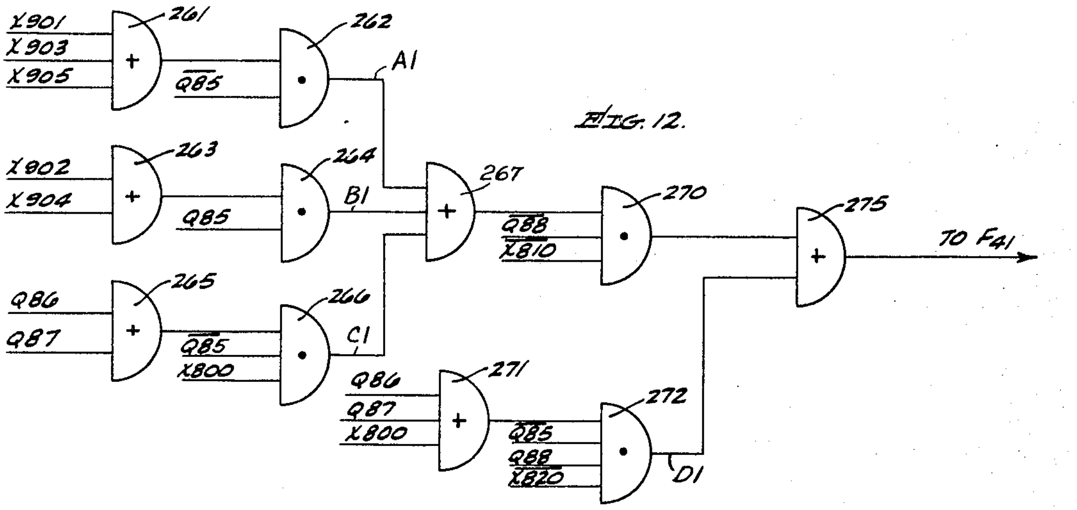

Briefly, then, the setting of flip-flop $F_{41}$ designated in the equation as SF41 is accomplished by ANDing terms A, $B_1$, and $C_1$, with signals $Q_{88}$ and $\overline{X810}$. The fourth term designated $D_1$ represents the operation of the circuit in controlling the setting of flip-flop $F_{41}$ in the search for end of clutter mode represented in the chart of FIGURE 5. This logic circuitry necessary for controlling the setting of flip-flop $F_{41}$ in accordance with Equation 3 is schematically diagrammed in FIGURE 12 wherein OR gate 261 and AND gate 262 generate term $A_1$ and OR gate 263 and AND gate 264 generate the term $B_1$ while the term $C_1$ is generated by OR gate 265 and AND gate 266. The output of gates 262, 264 and 266 are supplied through an OR gate 267 to an AND gate 270 which is also provided with the signals $Q_{88}$ indicating that the clutter has not been detected yet, i.e. the system is operating in a search of clutter mode and signal $\overline{X810}$ indicating that the count-threshold level has not been reached yet and therefore flip-flop $F_{41}$ may be set in either of its two binary states. The fourth term in Equation 3, i.e. term $D_1$ is generated by OR gate 271 and AND gate 272. The output of AND gates 270 and 271 are supplied to an OR gate 275 which provides a true output to flip-flop $F_{41}$ to set it in a true state indicative of a binary one when either of the outputs of gates 270 and 271 is true. If both are false, flip-flop $F_{41}$ will be set at false.

Figure 13:
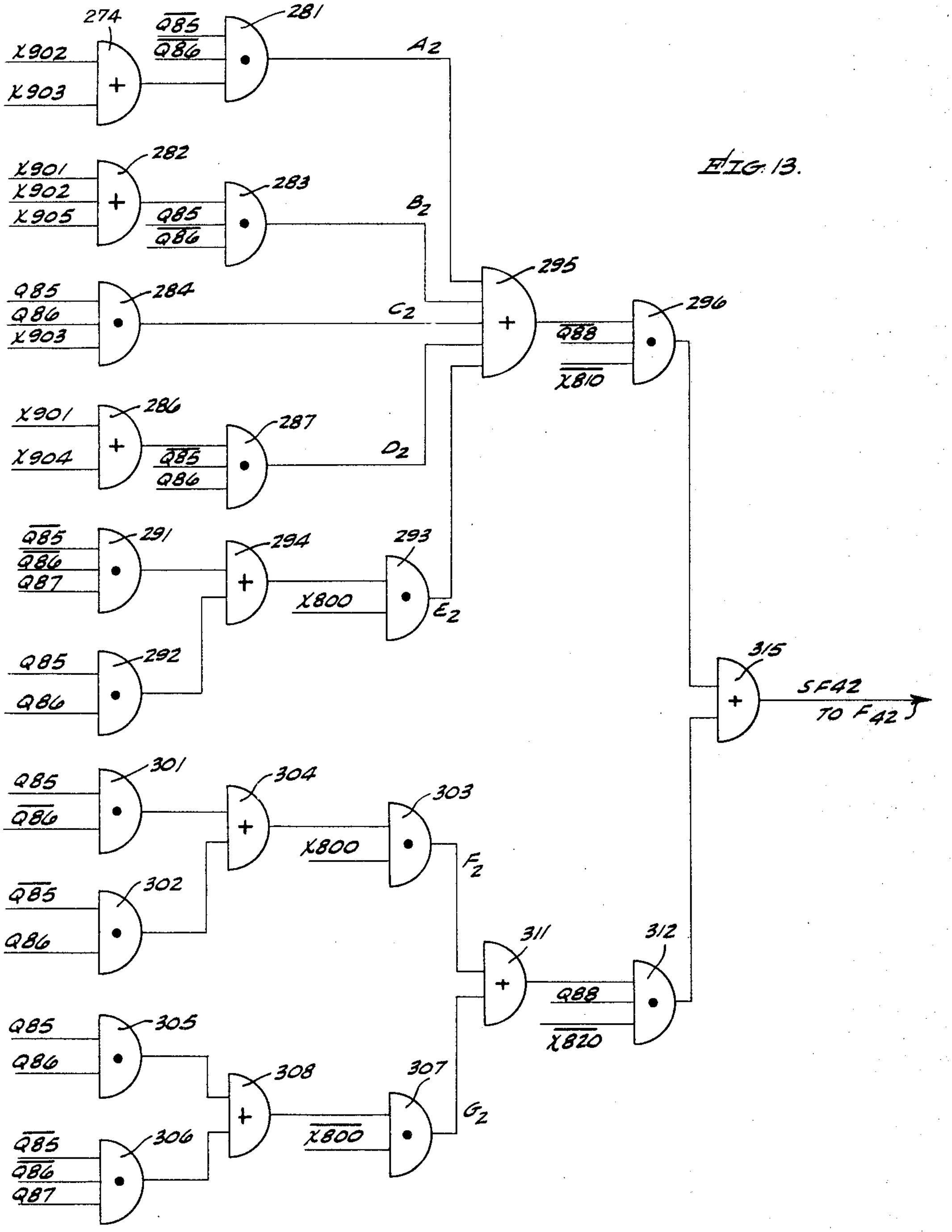

The logical operations performed by the counter write control circuit 60 (FIGURE 3) in setting flip-flops 42 and 53 may be similarly expressed by the following equations:

$$SF42 = [\overbrace{(\overline{Q85}\cdot\overline{Q86})\cdot(X902+X903)}^{A_2} + \overbrace{(Q85\cdot\overline{Q86})\cdot(901+X902+X905)}^{B_2} + \overbrace{Q85\cdot Q86\cdot X903}^{C_2} + \overbrace{(Q85\cdot Q86)\cdot(X901+X904)}^{D_2} + \overbrace{(\overline{Q85}\cdot\overline{Q86}\cdot Q87+Q85\cdot Q86)\cdot X800}^{E_2}]\cdot\overline{Q88}\cdot\overline{X810} + [\overbrace{(\overline{Q85}\cdot\overline{Q86}\cdot+Q85\cdot Q86)\cdot X800}^{F_2} + \overbrace{(Q85\cdot Q86+\overline{Q85}\cdot\overline{Q86}\cdot Q87)\cdot\overline{X800}}^{G_2}]\cdot Q88\cdot\overline{X820} \qquad (4)$$

$$SF43 = [\overbrace{(Q85\cdot Q86+Q87)X901}^{A_3} + \overbrace{Q86\cdot X902}^{B_3} + \overbrace{Q85\cdot X903}^{C_3} + \overbrace{Q87\cdot X902}^{D_3} + \overbrace{Q86\cdot X903}^{E_3} + \overbrace{Q87(Q85+Q86)\cdot X800}^{F_3} + \overbrace{X904+X905}^{G_3}]\cdot\overline{Q88}\cdot\overline{X810} + [\overbrace{(Q85\cdot Q86+Q87)\cdot X800}^{H_3} + \overbrace{Q87(Q85+Q86)\cdot\overline{X800}}^{I_3}]\cdot Q88\cdot\overline{X820} \qquad (5)$$

wherein SF42 represents the setting of flip-flop $F_{42}$ and SF43 represents the setting of flip-flop $F_{43}$. Reference is now made to FIGURE 13 which is a schematic diagram of the logic circuitry included in circuit 60, necessary to generate the signal SF43. In FIGURE 13 OR gate 274 and AND gate 281 generate the term $A_2$ while OR gate 282 and AND gate 283 are used to generate the second term $B_2$ and AND gate 284 provides term $C_2$. Term $D_2$ is provided by OR gate 286 and AND gate 287 while AND gates 291, 292 and 293 and OR gate 294 are used to generate the term $E_2$ in a manner similar to that hereinbefore described. Terms $A_2$ through $E_2$ are ORed in an OR gate 295, the output of which is ANDed with signals $Q_{88}$ and $\overline{X810}$ in an AND gate 296. The output of AND gate 296 is true to set flip-flop $F_{42}$ to true or a binary one state when the system is operated in a search clutter mode of operation and the second least significant bit of the three bit counter is to be set to a binary one. The rest of the circuitry shown in FIGURE 13 is used to control the setting of flip-flop $F_{42}$ when the system is operated in a search for the end of clutter as diagrammed in the chart of FIGURE 5. The system includes AND gates 301, 302 and 303 and OR gate 304 to generate the term $F_2$ while the term $G_2$ is generated by AND gates 305, 306, 307 and OR gate 308. Both terms $F_2$ and $G_2$ are ORed in an OR gate 311, the output of which is ANDed in a gate 312 with signals $Q_{88}$ and $\overline{X820}$. The output of AND gates 296 and 312 are ORed in a gate 315, the output of which is true whenever the second flip-flop $F_{42}$ is to be set to a true or a binary one state.

Figure 14:
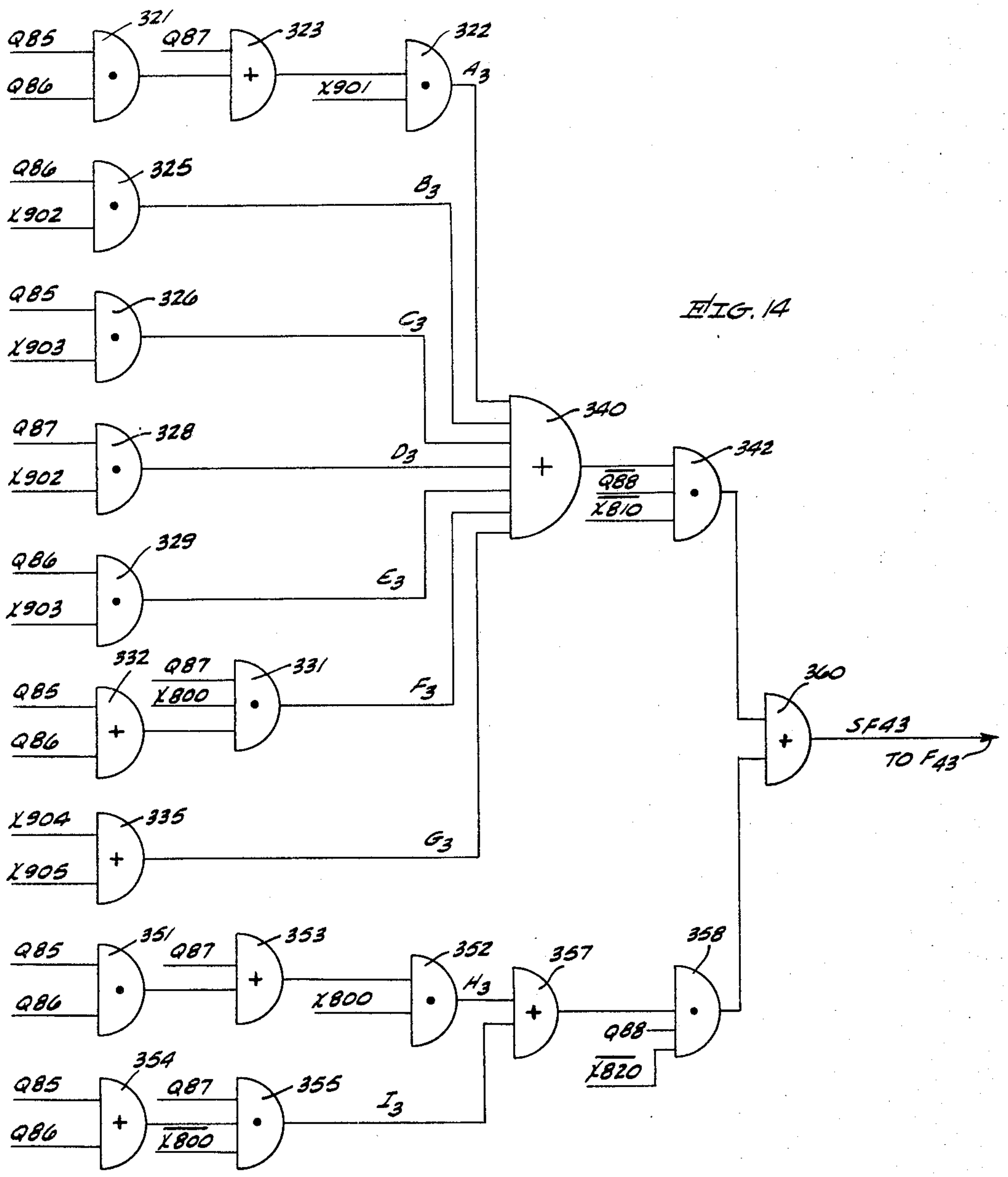

Reference is now made to FIGURE 14 which is a schematic diagram of the logic circuitry used to control the setting of flip-flop $F_{43}$ by generating the signal SF43. As seen therein, AND gates 321 and 322 together with OR gate 323 generate the term $A_3$ while term $B_3$ is generated by AND gate 325 and AND gate 326 generates the term $C_3$. In a similar manner, terms $D_3$, $E_3$ and $G_3$ are generated by AND gates 328 and 329 and OR gate 235 respectively while term $F_3$ requires an AND gate 331 and an OR gate 332. Terms $A_3$ through $G_3$ are ORed in an OR gate 340, the output of which is ANDed by an AND gate 342 together with the terms $Q_{88}$ and $\overline{X810}$. The output of AND gate 342 is true when the system is operated in the search clutter mode and the most significant bit of the three bit counter is to be set to a true or a binary one state. The setting of the flip-flop $F_{43}$ when the system is operated in a search of end of clutter mode is controlled by the other gates shown in FIGURE 14, wherein AND gates 351 and 352 together with OR gate 353 generate the term $H_3$ while the last term $I_3$ is generated by OR gate 354 and AND gate 355. Terms $H_3$ and $I_3$ are ORed in an OR gate 357, the output of which is ANDed in an AND gate 358 together with the terms $Q_{88}$ and $\overline{X820}$. The outputs of AND gates 342 and 358 are ORed in an OR gate 360, the output of which is true whenever flip-flop $F_{43}$ is to be set to a true state or a binary one state when the system is operated in either of its two modes of operation, i.e. the mode of searching for clutter or the mode in which the end of clutter is being searched for.

From the foregoing description, it should be appreciated that in accordance with the teachings of the present invention, a system is provided for sensing or detecting the presence of clutter in any of a plurality of range intervals from which video signals are received in response to each transmitted radar pulse. This is accomplished by associating with each range interval a computer word which includes a multibit counter, the count in which is modified as a function of the hit pattern received from the particular range interval as well as from adjacent range intervals in response to each video sweep. Thus a history of the hit patterns from each range interval and the neighboring range intervals is recorded for each range interval to determine the presence of clutter therein as a function of predetermined clutter presence criteria. Once clutter is detected, the system inhibits a target in the particular range interval from being used in the interpolation or processing of valid targets. Also, once clutter is detected, the system is switched to a mode to search for the end of clutter by again monitoring the history of hit patterns associated with the particular range intervals. A sufficient number of video sweeps which do not contain clutter indicating hit patterns for the particular range interval must be received before an end-of-clutter signal is produced re-enabling the system to use target data from the particular range interval, as well as switching the clutter searching system to a search clutter mode.

It should be further appreciated that in light of the foregoing description, modifications and equivalents may be made by those familiar in the art in the specific arrangement hereinbefore described for explanatory purposes, without departing from the true spirit of the invention. Therefore, all such modifications and/or equivalents are deemed to fall within the scope of the appended claims.

What is claimed is:

1. In a radar system, wherein series of successive binary signals are provided by a digitized receiver, a clutter detection system for detecting the presence of clutter signals in any of a plurality of range intervals comprising:

first means for sequentially storing the binary signals representing hits or misses from successive range intervals from at least a portion of a single radar sweep;

a memory including means for storing multibit memory words each word being associated with another of said range intervals and means for reading out and writing in binary signals in the bits in each words;

second means responsive to the signals stored in said first means for developing hit pattern-representing signals each signal being indicative of a hit pattern of hits in related range intervals; and write control logic means responsive to said hit pattern-representing signals and a selected number of bits of a memory word for storing in said selected number of bits binary signals indicative of the history of the hit patterns related to the range interval associated with said word in a sequence of radar sweeps, said latter means further including means for setting one bit of said selected number of bits to a first binary state to indicate the presence of clutter in said range interval when the other of said selected bits reach a predetermined state.

2. The system defined in claim 1 wherein said second means include gating means to generate any one of a plurality of hit-pattern-representing signals each representing hits in a different number of related range intervals.

3. The system defined in claim 2 wherein said write control logic means includes clutter search logic means for controlling the state of the selected number of bits of each word associated with another range interval as a function of the signal from said second means representing hits in a different number of range intervals including the range interval associated with said word, whereby the binary state of said bits is increased as the number of adjacent intervals having hits therein increased.

4. The system defined in claim 3 wherein said selected number of bits comprise a most significant bit and $n-1$ less significant bits, said $n-1$ bits and said most significant bits forming an $n$ bit binary counter the count in said $n-1$ bits being modified by said write control logic means as a function of the hit pattern-representing signals from said second means, said most significant bit being set to a first binary state when the count in said $n-1$ bits reaches a selected count threshold level to indicate the presence of clutter, said write control logaic means further including clutter presence reset means for resetting said count in said $n-1$ bits to zero when the presence of clutter is detected.

5. The system defined in claim 4 wherein said write control logic means includes end of clutter search means for controlling the count in said $n-1$ bits in the presence of clutter as a function of the hit pattern-representing signals from said second means and further includes end of clutter reset means for resetting said most significant bit to a second binary state when the count in said $n-1$ bits reaches a reset state, said second binary state being representative of the absence of clutter.

6. The system defined in claim 4 wherein said second means provides at least first, second, third, fourth and fifth hit pattern-representing signals corresponding to hits in 3, 4, 5, 6 and 7 adjacent range intervals respectively, and wherein said write control logic means includes hit pattern counting means for increasing the count in said $n-1$ bits by one, two, three, four and five as a function of said first, second, third, fourth and fifth signals respectively.

7. The system defined in claim 6 wherein said write control logic means further includes threshold level control means for automatically controlling said count threshold level as a function of at least said hit pattern-representing signals from said second means and the count in said $n-1$ bits.

8. The system defined in claim 6 wherein said end of the clutter search means is responsive to the first binary state of said most significant bit indicative of the presence of clutter for incrementing the count in said $n-1$ bits when hit patterns of hits in two or fewer adjacent range intervals are detected and for decrementing the count when hit patterns of hits in three or more adjacent range intervals are detected, and said end of clutter reset means resets said most significant bit to a second binary state indicative of the absence of clutter when the $n-1$ bit counter is augmented with a full count therein.

9. The system defined in claim 8 wherein $n$ is at least equal to four, the most significant being set to said first binary state to indicate the presence of clutter and to said second binary state to indicate the absence of clutter, the count in the other three bits being modified as a function of the binary state of the most significant bit and the hit pattern of each video sweep in range intervals related to the range interval associated with said bits.

10. In a system wherein signals received from different azimuth angles are quantized each video sweep into series of binary signals representing a hit or a miss in each of a plurality of range intervals along said different azimuth angles, an improved clutter detection system comprising:

multibit shift register means for sequentially storing the signal representing hits and misses from the range intervals in each video sweep, whereby hit or misses from adjacent range intervals are stored in adjacent bits in said shift register means, the signals therein advancing once each range interval period;

a computer including a memory for storing multibit computer words, each word being associated with another of said range intervals, located at another memory address, said computer further including means for reading out during each range interval period a word associated with another range interval and means for rewriting the data stored in the word in the address associated with said another range interval, each computer word including $n$ bits representing a counter associated with its respective range interval; and counter write control means for controlling the binary state of the $n$ bits in each word as a function of the history of the hit patterns in the range interval associated with said word and adjacent range intervals thereof.

11. The system defined in claim 10 wherein said counter write control means includes mode selection means for controlling the count in $n-1$ of the least significant bits of the $n$ bits of each word by controlling the binary states thereof as a function of the binary state of the most significant bit and the hit pattern of the range interval associated with said word in each video sweep.

12. The system defined in claim 11 wherein said counter write control means include clutter search logic means for increasing the count in said $n-1$ bits when the hit pattern represents hits in X or more consecutive range intervals and said most significant bit is in a first binary state indicative of the absence of clutter, the magnitude of the increase being directly related to X, and for decreasing the count when the hit pattern represents hits in less than X consecutive range intervals, said counter write control means further include clutter present reset means for resetting the $n-1$ bits to said first binary state and setting said most significant bit to the second binary state indicative of the presence of clutter when the count in said $n-1$ bits reaches a count threshold level.

13. The system defined in claim 12 wherein said count threshold level is a function of at least X and the count in three less significant bits of said counter.

14. The system defined ni claim 12 wherein $n=4$ and said control means includes means for incrementing the count by 1, 2, 3, 4 and 5 when X equals 3, 4, 5, 6, 7 respectively and means for decrementing the count by 1 when X is 2 or less.

15. The system defined in claim 14 wherein said count threshold level is a function of X, the count in the three less significant bits of said four bit counter and a level used in quantizing each video sweep into binary signals representing hits and misses.

No references cited.

RODNEY D. BENNETT, *Primary Examiner.*

T. H. TUBBESING, *Assistant Examiner.*

UNITED STATES PATENT OFFICE
CERTIFICATE OF CORRECTION

Patent No. 3,353,177 November 14, 1967

Richard D. Wilmot

It is hereby certified that error appears in the above numbered patent requiring correction and that the said Letters Patent should read as corrected below.

Column 2, line 6, for "hits" read -- hit --; column 7, line 22, for "79" read -- 78 --; column 8, line 44, for "Column $C_1$" read -- Column $C_0$ --; column 10, line 37, for "threshould" read -- threshold --; column 13, line 19, for "hits" read -- bits --; line 39, for "X(905)" read -- (X905) --; line 52, for "intervals" read -- interval --; column 14, line 34, for "fuor" read -- four --; line 43, for "levle" read -- level --; columns 13 and 14, equation (1) should appear as shown below instead of as in the patent:

$$
\begin{aligned}
X810= & [\overbrace{X905.XH}^{A}+\overbrace{(X905+X904.XH).Q85}^{B} \\
& +\overbrace{(X905+X904+X903.XH).86}^{C} \\
& +\overbrace{(X905+X904+X903+X902.XH).Q87}^{D} \\
& +\overbrace{(X905+X904+X903+X902+X901.XH).Q87.Q85}^{E} \\
& +\overbrace{(X905+X904+X903+X902+X901).Q87.Q86}^{F}].\overline{Q88}
\end{aligned}
$$

column 16, line 21, for "terms A" read -- terms $A_1$ --; lines 22 and 34, for "signals $Q_{88}$", each occurrence, read -- signals $\overline{Q_{88}}$ --; columns 15 and 16, equation (4) should appear as shown below instead of as in the patent:

$$SF42=[\overbrace{(\overline{Q85}.\overline{Q86}).(X902+X903)}^{A_2}$$

$$+\overbrace{(Q85.\overline{Q86}).(X901+X902+X905)}^{B_2}$$

$$+\overbrace{Q85.Q86.X903}^{C_2}+\overbrace{(\overline{Q85}.Q86).(X901+X904)}^{D_2}$$

$$+\overbrace{(\overline{Q85}.\overline{Q86}.Q87+Q85.Q86).X800}^{E_2}].\overline{Q88}.\overline{X810}$$

$$+[\overbrace{(Q85.\overline{Q86}+\overline{Q85}.Q86).X800}^{F_2}$$

$$+\overbrace{(Q85.Q86+\overline{Q85}.\overline{Q86}.Q87).\overline{X800}}^{G_2}].Q88.\overline{X820}$$

column 17, line 5, for "$Q_{88}$" read -- $\overline{Q_{88}}$ --; line 29, for "OR gate 235" read -- OR gate 335 --; line 33, for "terms $Q_{88}$" read -- terms $\overline{Q_{88}}$ --; column 18, line 26, for "words" read -- word --; line 65, for "logaic" read -- logic --; column 20, line 38, for "ni" read -- in --.

Signed and sealed this 25th day of February 1969.

(SEAL)
Attest:

EDWARD M.FLETCHER,JR.
Attesting Officer

EDWARD J. BRENNER
Commissioner of Patents